D. ZAIDEN.
CLASP.
APPLICATION FILED JULY 19, 1919. RENEWED SEPT. 15, 1920.
1,368,593.
Patented Feb. 15, 1921.
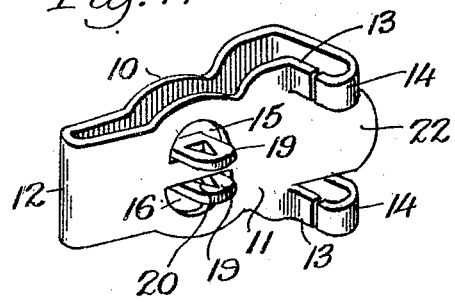
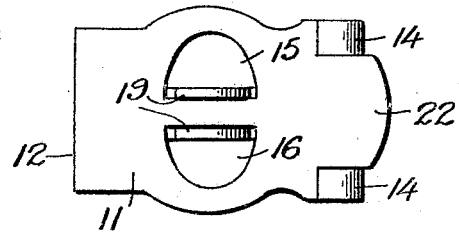
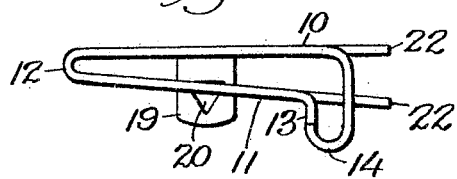
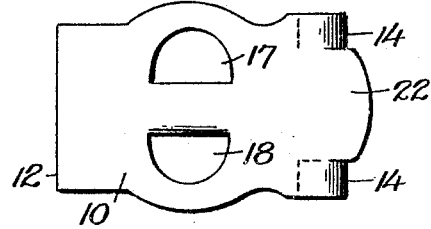
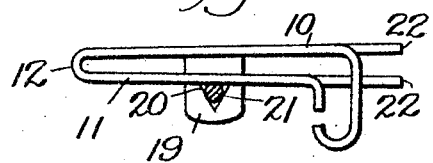
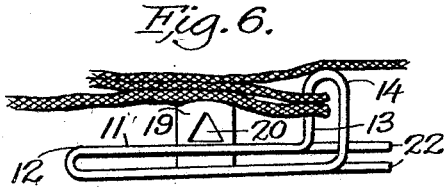
Inventor,
David Zaiden,
by James F. Duhamel,
Attorney.

UNITED STATES PATENT OFFICE.

DAVID ZAIDEN, OF NEW YORK, N. Y.

CLASP.

1,368,593.  Specification of Letters Patent.  Patented Feb. 15, 1921.

Application filed July 19, 1919, Serial No. 311,962. Renewed September 15, 1920. Serial No. 410,485.

*To all whom it may concern:*

Be it known that I, DAVID ZAIDEN, a citizen of the United States, residing at New York, New York county, New York State, have invented certain new and useful Improvements in Clasps, of which the following is a specification.

This invention relates to clasps and comprises two oppositely situated plates with a spring connection, that normally keeps them separated, and having coöperating jaws and one plate with perforated lips extending through openings in the other, the object of the invention being to locate fabrics and the like such as scarfs and neckties between the jaws to hold them to the shirt or to pass a stick pin through the perforated lips so that the adjacent plate will exert a pressure thereon and lock it within a tie and prevent its loss.

These and other details and objects of the invention will be more fully described in the following specification, set forth in the appended claims and illustrated in the accompanying drawing, wherein:

Figure 1 is an enlarged perspective view of the clasp.

Fig. 2 is a front view of the same.

Fig. 3 is a top plan view.

Fig. 4 is a rear view.

Figs. 5 and 6 are top plan views of the device clasping a stick pin and a scarf respectively.

The views in the drawings are greatly enlarged so that the device may be more clearly shown and the whole is stamped from a single piece of sheet metal and comprises the two plates 10 and 11 united by the resilient bow 12 and normally sprung away from each other as best shown in Fig. 3.

The outer ends of the plate have coöperating jaws 13 and 14 for engaging and holding fabrics such as sleeves, scarfs, ties, napkins and articles of apparel. The jaws 13 have a short right angle turn while the jaws 14 extend beyond plate 11, turn at a right angle parallel with jaws 13 and then curve toward the latter and impinge their extremities.

The operation of these jaws is shown in Fig. 6 where they are shown grasping a shirt plait and a scarf to secure the latter.

In the side of plate 11 are cut two openings 15 and 16 and in plate 10 are stamped similar openings 17 and 18. The metal is left attached to the bases of openings 17 and 18, and is bent at right angles through the openings 15 and 16 and beyond the side of plate 11 to form lips 19 with angular perforations 20, preferably triangular so as to grip any pin or wire passed through them.

It will be seen in Fig. 3 that the side 11 when sprung outward to its limit will partly cover the perforations 20 and if a pin 21, such as shown in Fig. 5, is run through the perforations when the plate is depressed, the said pin will be grasped in the acute angles of the perforations and held there against loss. The jaws 13 and 14 may also engage the tie in which the pin 21 is employed and doubly secure the pin if it is a valuable one. The clasp will, when used for a pin be located near the lower end of the latter so that it cannot be pulled out.

In order to readily manipulate the clasp it is provided with tongues 22 extending outward from between the jaws of both plates and when pressed toward each other by the fingers will open the jaws and the perforations 20.

It is obvious that the parts may be otherwise arranged or modified without departing from the essential features above described or from the scope of the appended claims.

What I claim as new is:

1. In a clasp, the combination of two oppositely disposed members substantially parallel with each other united by a flexible section and one member having perforations, lips with gripping perforations projecting from one member and playing through said perforations of the other member, jaws at the outer ends of the members and limiting their outward movement, and handles at the outer ends of the members to compress them and open the jaws.

2. In a clasp, the combination of a plate comprising two oppositely disposed members with flexible connections and having perforations in one of the members, gripping lips extending from the other member and playing through the perforations, an upturned jaw on one of the members, and an overlapping jaw on the other member adapted to grip an object and limit the separation of the jaws.

In testimony whereof I have signed my name to this specification in the presence of two subscribing witnesses this 27th day of June, 1919.

DAVID ZAIDEN.

Witnesses:
DAVID SNYDER,
JAMES F. DUHAMEL.